Oct. 4, 1938.    W. B. ELMER    2,132,258
TREE GUARD FOR AERIAL WIRES
Filed March 18, 1936
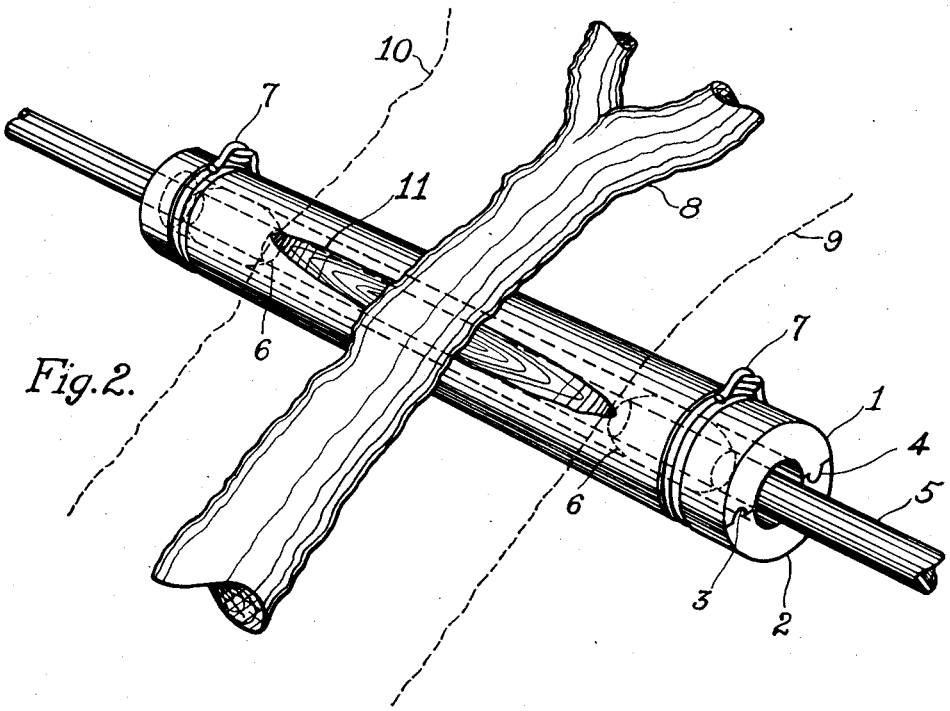
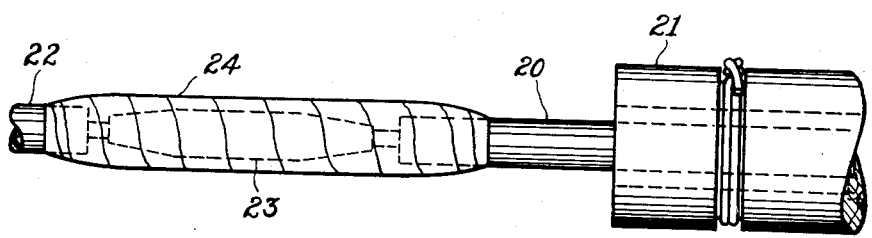
Inventor:
William B. Elmer Patented Oct. 4, 1938

2,132,258

UNITED STATES PATENT OFFICE 2,132,258

TREE GUARD FOR AERIAL WIRES

William B. Elmer, Winchester, Mass.

Application March 18, 1936, Serial No. 69,504

2 Claims. (Cl. 173—28)

My invention relates to improvements in wooden guards of the type which are attached to aerial wires or cables, for the purpose of preventing damage by the abrasive action of swaying tree limbs and tree trunks; and the objects of the improvements are: first, to provide a guard which will constantly maintain a self-lubricating surface between the swaying tree and the wire to be protected, until the guard is completely worn through; second, to provide a guard of greater wearing ability than previously used guards of equal thickness; third, to provide a guard which may be quickly and inexpensively applied to the wire; and fourth, for electric distribution wires in particular, to provide an insulated tree guard which may be cut into a span of line wire where necessary with a minimum of expense.

The device which is the subject of this invention is constructed of wood, chiefly maple, impregnated throughout with a mixture of waxes, oils or petrolatums which are liquid at the impregnating temperature, but solid and waxy at temperatures below 120° F. The construction of the abrasion-resisting tree guard is hereinafter described and shown on the attached drawing.

In the drawing—

Fig. 1 is a cross sectional view of the wood molding which is used in forming the tree guard of my invention;

Fig. 2 is a perspective view of the tree guard assembled upon an aerial wire adjacent a tree limb; and Fig. 3 is a fragmentary side elevation view showing a method of splicing into a line wire to be protected a section of insulated wire provided with my tree guard.

The maple wood used in the construction of the guard is first cut to form a molding with cross-section as shown in Figure 1 of the drawing. This cross-section is such that two strips of molding as in Figure 2, 1 and 2, may be placed together about a wire to be protected from tree abrasion, thus forming a complete protective enclosure, with matching tongues and grooves 3 and 4. I use a wood molding with radial thickness of ⅜ inch and have found that 3-foot and 5-foot lengths are most useful. I have further found that moldings of three different inside diameters will satisfactorily cover the range of wire sizes commonly used for overhead power supply lines.

The molding, after shaping, is completely impregnated throughout under high pressure and high temperature, with a mixture of Montan wax and light oil in the ratio 60:40.

The impregnated molding should be applied to the wire 5 (Figure 2) to be protected, so tightly that the two matching halves do not quite come into contact with each other, but remain separated by a gap of $\frac{1}{32}$ inch or more along both edges when tightly pressed together. If the wire is too small to completely fill the molding, the wire should first be built up in diameter at three or more points with wrappings of electrician's black friction tape 6 until the required fit is obtained.

There are several methods for securing the guard in place over the wire, but I prefer that shown in Figure 2 as being most inexpensive. Grooves 7 are cut around the molding near the ends, and on long pieces of molding, 4 feet or more in length, a groove is also cut near the center. Soft copper wires of #8 AWG. are then wrapped tightly twice around the molding in the grooves and the ends of said wires are twisted twice and laid down beside the turns. When properly secured in place, it should not be possible to shift the molding along the wire by hand, because of the gripping effect of the bindings in holding the molding tightly against the wire or against the friction tape applied over the wire.

The guard as described is intended to be placed on wires at points of exposure to tree limbs such as shown by 8 in Figure 2. The limb 8 will normally sway between limits 9 and 10 causing abrasive action along the surface area 11 of the tree guard. This area 11 develops a smooth, glossy finish which wears very slowly and has a self-lubricating property because of the wax and oil compound impregnated into the wood, which compound is continually present at the contact surface as the wood is worn away.

The tree guard as described is useful for protecting low voltage electric wires and/or span or supporting wires from damage by trees. The insulating properties of the treated wood molding are not adequate for wires of medium or higher voltages, that is, for wires of 600 volts or over. If such higher voltage wires already have an adequate wall of electrical insulation, the tree guard may be applied as already described. If such wires do not already have an adequate wall of electrical insulation, it will be necessary to apply insulation to the wire or to splice in a short section of adequately insulated wire before applying the tree guard. An example of the latter method is shown in Figure 3 of the drawing. A piece of insulated wire 20 long enough to extend well beyond the ends of the molding 21 is spliced into line wire 22 at the location to be protected. A Western Union twisted splice, a twisted sleeve splice, a solderless mechanical splice or any other method which will establish an adequate mechanical and electrical connection may be used to join wires 20 and 22, but I prefer to use the "Electroline" automatic line splice 23. The connections are then covered with insulating and weatherproof taping 24. The molding 21 is then applied to wire 20 and secured in place by any of the beforementioned securing means.

It is sometimes desirable to prefabricate in the shop complete insulated tree guard assemblies for splicing into medium voltage electric supply wires. Such assemblies consist of the following portions of Figure 3; insulated wire 20, tree molding 21 thereon secured and automatic line splices 23 attached to both ends of wire 20.

These prefabricated insulated tree guards may be quickly installed in aerial wire by attaching wire grips or "come-alongs" to the wire at points farther apart than the extreme length of the prefabricated guard, cutting out a section of wire of equal length, and substituting the insulated tree guard therefor. With automatic line splices of the type described this operation may be completed in a minimum of time and expense.

When prefabricated insulated tree guards are constructed a one-piece cylinder of treated wood with a central opening into which the insulated wire is secured may be used, instead of the two-piece matched molding which must be bound in place by external securing means.

Electric power and communication conductors supported on wooden poles and aerial span wires of various descriptions frequently come in conflict with trees. The tree contact is objectionable because of the common tendency of the tree trunks or tree limbs to sway, which produces a rubbing action against the wire. This rubbing action will, if continued, wear the wire or cable or the insulating covering thereof to a point where electrical leakage or mechanical weakness or both ensue. "Tree insulators" which are secured to the tree rather than to the wire have been frequently used in the past to protect electric wires from tree contacts. Wooden abrasion-resisting guards have also been commonly used both on electric wires and on supporting span wires. Certain abrasion-resisting tree guards in common use in the past have been applied to the wires without lubrication, the toughness and thickness of the wood used being depended upon to give satisfactory life. It is objectionable to install a bulky guard on such a wire because the wind pressure on such increased areas may appreciably increase the strength requirements and expense of the supporting structures or may overload existing structures. In climates where sleet is experienced the sleet load is likewise increased by such increased areas, and the strength requirements and expense of the supporting structures may be increased or existing structures may be overloaded for this reason also. In some locations where the interfering trees cannot be trimmed or cut down, the rate of wear, even upon a thick wooden guard, if untreated, may be relatively rapid. In order to reduce the rate of wear in such locations, some guards have been used which have been boiled in paraffin. While superior to previous guards in wear-resisting qualities, such guards lose their lubricating property after the surface has been worn through, since no appreciable penetration of the wood is obtained by that method of treatment.

The tree guard herein described is thoroughly and completely impregnated throughout by a temperature and pressure treatment with a 60:40 mixture of Montan wax and light mineral oil. I have found that as the surface wears, the wood continually presents a new waxy lubricating surface which effectively resists the tree abrasion. This action is so pronounced that the life of the guard is greatly increased over that of unimpregnated guards, and it is possible to construct a guard of better wearing quality than has been available previously. The glossy waxy surface which is developed on the guard at the point of contact with the tree lubricates said point of contact to the extent that none of the usual chafing of the fibres of the guard takes place. Instead of a continuous chewing effect, as a result of which the guard is gradually disintegrated, a slicking effect is produced which preserves the surface structure of the wooden guard. Whereas some guards of the unimpregnated type have been commonly worn through in a few months at points where the trees exert extreme pressure against the wire, guards of the type described have shown but moderate wear after more than two years experimental service at the most severe locations.

Many waxes, greases, or combinations of waxes or greases with oils, or other lubricating materials may be used to impregnate any hard woods of the type which will absorb impregnating materials under pressure and/or vacuum and temperature treatments. A combination of 40% Montan wax and 60% hard petrolatum will produce a compound of equivalent lubricating characteristic to the 60% Montan wax and 40% light oil which I now use. Other compounds in which hard petrolatum predominates are equally satisfactory. To be suitable for my purpose, any compound used must be solid or plastic, but not fluid, below 120° F. and should be waxy and not sticky below this temperature.

While I have described a specific form of molding, the spirit of this invention is intended to include any form of wooden molding which is pressure-impregnated at least to a substantial depth with a suitable lubricant, and secured to an aerial wire to guard such wire from tree abrasion.

What I claim is:—

1. An abrasion resisting device for application to aerial wires or cables consisting of a hard wood guard impregnated throughout with a mixture of Montan wax and light oil having a melting point of not less than 120° F., said wooden portion being tubular and divided lengthwise into two equal parts, mutually tongued and grooved, and means for securing same together and to the article to be protected.

2. An abrasion resisting device for application to aerial wires or cables, consisting of a hard wood guard impregnated to a substantial depth with a mixture of Montan wax and light oil having a melting point of not less than 120° F., said wooden portion being tubular and divided lengthwise into two equal parts, mutually tongued and grooved, and means for securing same together and to the article to be protected.

WILLIAM B. ELMER.